(12) United States Patent
Touitou et al.

(10) Patent No.: US 12,511,435 B2
(45) Date of Patent: Dec. 30, 2025

(54) DEVICE AND METHOD FOR ENFORCING A DATA POLICY

(71) Applicant: HUAWEI CLOUD COMPUTING TECHNOLOGIES CO., LTD., Guizhou (CN)

(72) Inventors: Dan Touitou, Munich (DE); Avigail Oron, Hod Hasharon (IL)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 579 days.

(21) Appl. No.: 17/243,963

(22) Filed: Apr. 29, 2021

(65) Prior Publication Data
US 2021/0248269 A1     Aug. 12, 2021

Related U.S. Application Data

(63) Continuation of application No. PCT/EP2018/079823, filed on Oct. 31, 2018.

(51) Int. Cl.
*G06F 21/62* (2013.01)
*G06F 21/44* (2013.01)
(Continued)

(52) U.S. Cl.
CPC .......... *G06F 21/6254* (2013.01); *G06F 21/44* (2013.01); *G06F 21/53* (2013.01); *G06F 21/602* (2013.01); *G06F 2221/2149* (2013.01)

(58) Field of Classification Search
CPC ...... G06F 21/6254; G06F 21/44; G06F 21/53; G06F 21/602; G06F 2221/2149; G06F 21/85; G06F 21/6245
See application file for complete search history.

(56) References Cited

U.S. PATENT DOCUMENTS

| | | | |
|---|---|---|---|
| 6,499,110 B1* | 12/2002 | Moses | G06F 21/602 726/1 |
| 7,730,138 B2* | 6/2010 | Ballinger | H04L 67/5682 709/206 |

(Continued)

FOREIGN PATENT DOCUMENTS

| | | | | |
|---|---|---|---|---|
| CN | 1420488 A | | 5/2003 | |
| CN | 102067143 A | * | 5/2011 | ......... H04L 63/0407 |

(Continued)

OTHER PUBLICATIONS

Mihir Bellare, "Format-Preserving Encryption", Part of the book series: Lecture Notes in Computer Science ((LNSC, vol. 5867)), pp. 295-312, 25 pages (Year: 2009).*

(Continued)

*Primary Examiner* — Shahriar Zarrineh
(74) *Attorney, Agent, or Firm* — Maier & Maier, PLLC (57) ABSTRACT

A data access device for enforcing a data policy, including an input unit, a processing unit, a data exposure enforcement unit, and an output unit, where the data access device is configured to run in a trusted execution environment; the input unit is configured to receive a first data including a request for handling data, and a target identification; the processing unit is configured to process the first data to attain a second data including the target identification and a data structure according to requirements of an application running in the data access device; the data exposure enforcement unit is configured to manipulate the second data according to a data exposure policy to attain a third data; and the output unit is configured to output the third data.

8 Claims, 4 Drawing Sheets

(51) Int. Cl.
*G06F 21/53* (2013.01)
*G06F 21/60* (2013.01)

(56) References Cited

U.S. PATENT DOCUMENTS

| | | | | |
|---|---|---|---|---|
| 7,987,496 | B2* | 7/2011 | Bryce | H04L 63/0227 726/1 |
| 10,331,950 | B1* | 6/2019 | Suriyanarayanan | G06V 30/416 |
| 11,095,554 | B2* | 8/2021 | D'Acunto | H04L 67/14 |
| 2004/0255133 | A1* | 12/2004 | Lei | G06F 21/6227 713/193 |
| 2005/0010883 | A1 | 1/2005 | Wood | |
| 2005/0240985 | A1* | 10/2005 | Alkove | G06F 21/10 726/1 |
| 2007/0110282 | A1* | 5/2007 | Millsapp | G06V 40/10 705/72 |
| 2007/0192327 | A1* | 8/2007 | Bodin | G06F 16/9535 |
| 2008/0263645 | A1* | 10/2008 | Renter | H04L 63/0428 705/66 |
| 2010/0313273 | A1* | 12/2010 | Freas | G06F 21/40 707/769 |
| 2011/0295751 | A1* | 12/2011 | Matsuo | G06Q 30/0273 705/14.69 |
| 2013/0060796 | A1* | 3/2013 | Gilg | G06Q 30/0605 707/756 |
| 2013/0268997 | A1 | 10/2013 | Clancy, III et al. | |
| 2014/0007222 | A1* | 1/2014 | Qureshi | H04L 67/10 726/16 |
| 2014/0380404 | A1* | 12/2014 | Raj | G06F 21/6218 726/1 |
| 2015/0154418 | A1* | 6/2015 | Redberg | H04L 63/20 713/165 |
| 2016/0036860 | A1* | 2/2016 | Xing | G06F 21/6227 726/1 |
| 2016/0117162 | A1 | 4/2016 | Searle et al. | |
| 2017/0006064 | A1* | 1/2017 | Agarwal | H04L 9/3263 |
| 2017/0039376 | A1* | 2/2017 | Skipper | G06F 21/604 |
| 2017/0039378 | A1* | 2/2017 | Skipper | G06F 21/6209 |
| 2017/0039379 | A1* | 2/2017 | Skipper | H04L 63/20 |
| 2017/0039389 | A1* | 2/2017 | Smith | G06F 21/6245 |
| 2017/0272472 | A1* | 9/2017 | Adhar | G06F 21/602 |
| 2017/0329937 | A1* | 11/2017 | Choi | G06F 21/16 |
| 2018/0020001 | A1* | 1/2018 | White | H04L 63/0428 |
| 2018/0218173 | A1* | 8/2018 | Perkins | G06F 21/6254 |
| 2018/0293283 | A1* | 10/2018 | Litoiu | G06F 16/2465 |
| 2018/0307859 | A1* | 10/2018 | LaFever | H04L 63/20 |
| 2019/0130122 | A1* | 5/2019 | Barnes | G06F 21/602 |
| 2019/0205869 | A1* | 7/2019 | Nair | G06Q 20/383 |
| 2019/0268340 | A1* | 8/2019 | Decouteau | H04L 63/105 |
| 2020/0110903 | A1* | 4/2020 | Reilly | H04N 1/4446 |

FOREIGN PATENT DOCUMENTS

| | | | | |
|---|---|---|---|---|
| CN | 104077533 | A | | 10/2014 |
| CN | 102473228 | B * | 4/2015 | ........... A61B 5/0024 |
| CN | 104255000 | B * | 11/2017 | ......... H04L 12/1407 |
| CN | 107431621 | A | | 12/2017 |
| CN | 104838630 | B * | 10/2018 | ............. G06F 21/00 |
| CN | 107251069 | B | | 9/2020 |
| EP | 3422752 | A4 * | 1/2019 | ........ H04W 28/0289 |
| RU | 2701111 | C2 * | 9/2019 | ............. G06F 21/10 |
| WO | WO-2011104663 | A1 * | 9/2011 | ......... G06F 21/6227 |
| WO | WO-2018174846 | A1 * | 9/2018 | |

OTHER PUBLICATIONS

Michele Guerriero, "Defining, Enforcing and Checking Privacy Policies In Data-Intensive Applications", SEAMS '18: Proceedings of the 13th International Conference on Software Engineering for Adaptive and Self-Managing Systems pp. 172-182 , https://doi.org/10.1145/3194133.3194140 (Year: 2018).*

Ning Zhang, "PrivacyGuard: Enforcing Private Data Usage with Blockchain and Attested Execution", Conference paper First Online: Sep. 7, 2018 , pp. 345-353 (Year: 2018).*

Rodney Beede et al., "MyShield: Protecting Mobile Device Data via Security Circles", Technical Report CU-CS-1091-12, Jan. 2012, total 14 pages.

Robin Jacob, "Using Aggregate Administrative Data in Social Policy Research", Opre Report #2016-91, Dec. 2016, total 6 pages.

* cited by examiner

DEVICE AND METHOD FOR ENFORCING A DATA POLICY

CROSS-REFERENCE TO RELATED APPLICATIONS

This application is a continuation of International Application No. PCT/EP2018/079823, filed on Oct. 31, 2018, the disclosure of which is hereby incorporated by reference in its entirety.

TECHNICAL FIELD

The embodiments relate the field of communications technologies, and in particular to a device and a method for enforcing a data policy in a communications system.

BACKGROUND

Users of an application are reluctant to trust that application with their confidential data for the fear of it being disclosed to: other users of the application, the application owner/service provider, and/or governments or other legal agencies as a result of a warrant.

While a service provider may at least publish its data privacy policy, there are no ways to prove how this privacy policy is being enforced. In the case of official requests to disclose data, which a user has entrusted an application with, there is at present no way to protect the data against such requests.

There is a clear need for protection of user data entrusted in such application's care to improve the trustworthiness of such applications and encourage the use of applications in a communications network.

SUMMARY

In view of the above-mentioned problems and disadvantages, the embodiments aim at improving the trustworthiness of applications entrusted with data. Thus, the embodiments aim at providing transparency to the data providers on how their data will be used and who will be able to access their data in order to bring a new level of trust for data providers, since the embodiments ensure that their data cannot be used in any way that does not comply with the data policy published by the data handler.

A first aspect of the embodiments provides a data access device for enforcing a data policy including an input unit, a processing unit, a data exposure enforcement (DEE) unit and a output unit, where the data access device is configured to run in a trusted execution environment (TEE); the input unit is configured to receive a first data including a request for handling data, and a target identification (ID); the processing unit is configured to process the first data to attain a second data including the target ID and a data structure according to requirements of an application running in the data access device; the DEE unit is configured to manipulate the second data according to a data exposure policy (DEP) to attain a third data; and the output unit is configured to output the third data.

In an implementation form of the first aspect, the request for handling data includes the request to provide data to the application or to retrieve data from the application.

In an implementation form of the first aspect, the DEP is a set of instructions to control the DEE unit, where the instructions include anonymization instructions to identify data in the second data to be anonymized by identifying the according identification fields in the data structure; exposure instructions to identify other data in the second data meant to be exposed and to instruct to which target IDs and how the identified other data is to be exposed; and an aggregation policy to control the aggregation of data of a specific data type in the second content data before further processing is performed, where any instruction in the set of instructions is executed depending on any of the target IDs.

In an implementation form of the first aspect, the DEE unit further includes a parser unit and a manipulator unit, where the parser unit is configured to identify participating data types in the data structure; and the manipulator unit is configured to manipulate the second data by dropping, masking or encrypting data fields in the data structure according to the DEP to attain the third content data.

In an implementation form of the first aspect, the data fields include identification fields and other data fields; and the manipulator unit is configured to manipulate the second data by dropping, masking or encrypting the identification fields, if the DEP requires anonymization and/or to manipulate the second data by dropping, masking or encrypting any data field, which the DEP requires to manipulate.

In an implementation form of the first aspect, the DEP is stored in the DEE.

In an implementation form of the first aspect, the DEP is disclosed to all target IDs.

In an implementation form of the first aspect, the DEE unit further includes an aggregation controller configured to calculate a permitted amount of aggregations of the second data, where aggregation includes an accumulation of the second data due to repeated data input; and to buffer the aggregating subset of the second data, which is affected by the aggregation policy, until a condition of the aggregation policy is met.

In an implementation form of the first aspect, the DEE unit further includes an encryption storage and an extraction storage, where the encryption storage is configured to buffer data by encrypting and storing the aggregating subset of the second data; and the extraction storage is configured to store data by decrypting and storing the aggregated subset of the second data as the third data, when the condition of the aggregation policy is met.

In an implementation form of the first aspect, the aggregation policy includes an instruction to the DEE unit that no field is be exposed unless at least a certain amount of distinct first data entries has been provided to the data access device.

In an implementation form of the first aspect, the aggregation policy includes another instruction to the DEE unit that a calculated field in the aggregated subset of the second data is only exposed if more than a certain amount of distinct first data entries identified has been provided to the data access device.

A second aspect of the embodiments provides a method for enforcing a data policy, including running a data access device in a TEE; receiving, by a input unit, a first data including a request for handling data and a target ID; processing, by a processing unit, the first data to attain a second data including the target ID and a data structure data according to requirements of an application running in the data access device; manipulating, by a DEE unit, the second data according to a DEP, to attain a third data; and outputting, by an output unit, the third data.

A third aspect of the embodiments provides a computer program product including a program code for performing, when running on a computer, the method according to the second aspect.

The embodiments provide a data access device for enforcing a data exposure policy and a method for enforcing a data exposure policy. The data access device for enforcing a data policy includes an input unit, a processing unit, a DEE unit and an output unit, where the data access device is configured to run in a TEE; the input unit is configured to receive a first data including a request for handling data, and a target ID; the processing unit is configured to process the first data to attain a second data including the target ID and a data structure according to requirements of an application running in the data access device; the DEE unit is configured to manipulate the second data according to a DEP to attain a third data; and the output unit is configured to output the third data.

Since all components of the data access device or all application components within the data access device are running in a TEE, the DEE mechanism reliably enforces the DEP, which therefore allows complete transparency to the data providers on how their data will be used and who will be able to access it. A TEE, such as Intel's Software Guard Extensions (SGX) technology or AMD's Secure Memory Encryption (SME) is a secure area inside a main processor that ensures that an application running in it has the following properties: code immutability—logic of the protected application cannot be altered; data confidentiality—application data cannot be accessed and Attestation—the protected application has the ability to prove to a third party it is communicating with its identity, i.e. that it is indeed a specific program running in the TEE.

This brings a new level of trust for the data providers, since the new DEE mechanism guarantees that data of data providers, e.g. users, cannot be used in any way that does not comply with the policy. At any point, all stakeholders or users of the data access device can use attestation as an integral part of the TEE to verify the trustworthiness of the service.

It can be noted that all devices, elements, units and manners described in the embodiments could be implemented in the software or hardware elements or any kind of combination thereof. All steps which are performed by the various entities described in the embodiments, as well as the functionalities described, to be performed by the various entities are intended to mean that the respective entity is adapted to or configured to perform the respective steps and functionalities. Even if, in the following embodiments, a specific functionality or step to be performed by external entities is not reflected in the description of a specific detailed element of that entity which performs that specific step or functionality, it should be clear for a person of ordinary skill in the art that these methods and functionalities can be implemented in respective software or hardware elements, or any kind of combination thereof.

BRIEF DESCRIPTION OF THE DRAWINGS

The above described aspects and implementation forms of the embodiments will be explained in the following description in relation to the enclosed drawings, in which.

DETAILED DESCRIPTION OF THE EMBODIMENTS

Figure 1:
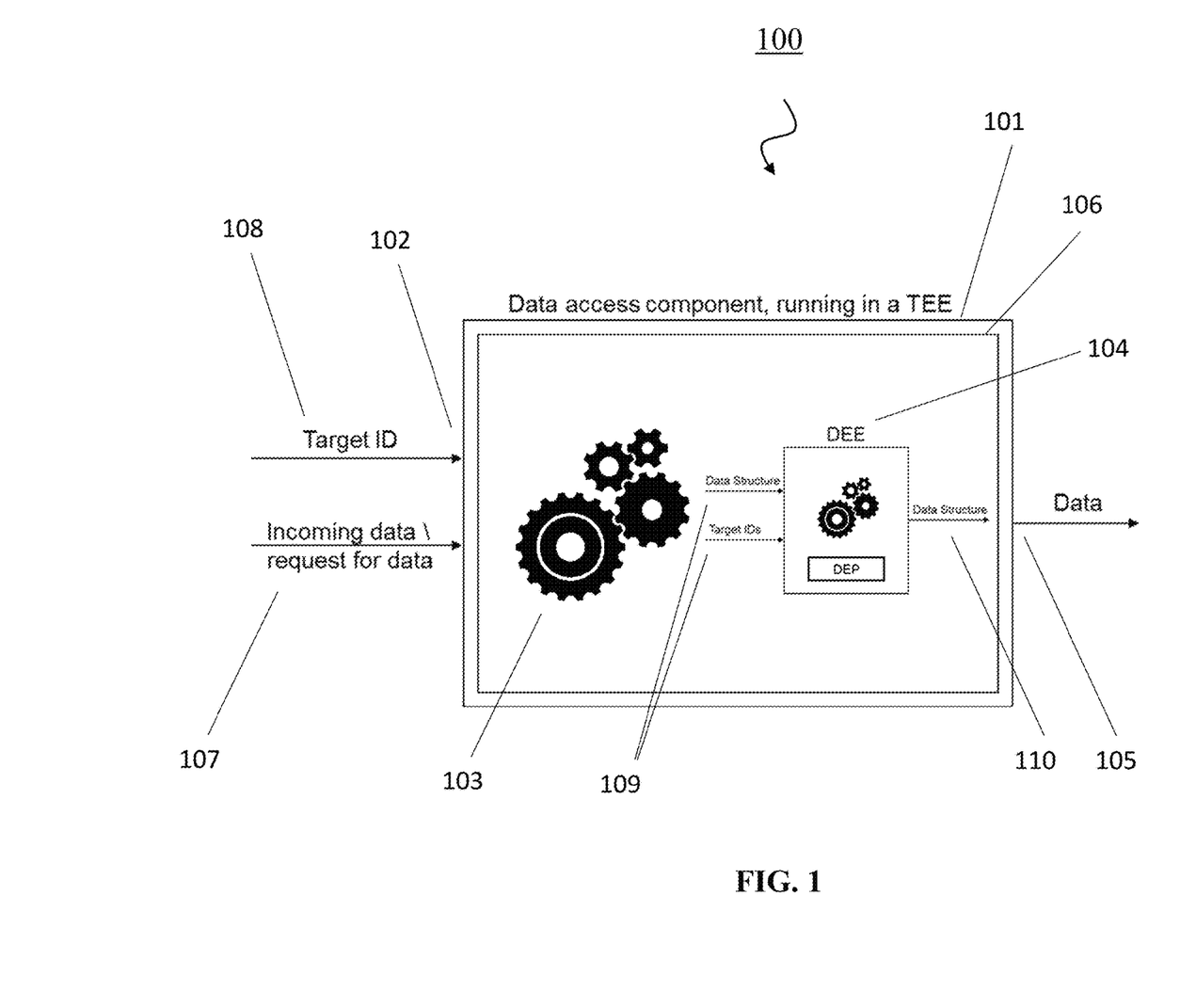
FIG. 1 shows a device according to an embodiment.

FIG. 1 shows a data access device 100 according to an embodiment. The data access device 100, which is identified in FIG. 1 as the embodiment "data access component, running in a TEE", is a device, application or application component 106, which is embedded in a trusted execution environment (TEE) 101 and includes an input unit 102, a processing unit 103, a data exposure enforcement (DEE) unit 104 and an output unit 105.

The TEE 101 is known from prior art (e.g. Intel's SGX, AMD's SME) as a computing mechanism that provides two capabilities required for solving the problems mentioned above:

Resource protection for confidential data & data encryption keys—since only the code running in the TEE can access the keys & data, no one else, including the service provider, can access the code. Hence, the integrity of code and data loaded inside the TEE is ensured.

Attestation—is a computing mechanism that proves to all users of a service within the TEE that the service is indeed 'trusted' and is provided by the source it claims to be. Confidentiality of the communication between the user and the data access device is ensured.

The input unit 102 is configured to receive a request for handling data 107 and a target identification (ID) 108, where the data to be handled by the data access device 100 may include incoming data provided by a user or retrieval data to be retrieved/calculated from/by the data access device upon a request to do so by a user, where the user of the data access device may be any entity enabled or authorized to address a request for handling data to the data access device. Hence, a user may be a human user, an entity as just described, a user role or another application component. The use of the term user in the following is to be understood in this general sense.

The input unit 102 is further configured to receive a target ID 108, which represents a user. The request for handling data 107 may be received by the input unit 102, which is configured to pass the request on to a processing unit 103 of the data access device 100.

The processing unit 103 is configured to process the request for handling data 107 and the target ID 108. If the request for handling data 107 includes a request for handling incoming data 107, which may be provided by the user, the processing unit 103 may perform any measures to translate, parse, enrich, restructure and/or format the data to transform the raw input data into a data structure, which is meaningful to and expected by the application or application component executing an intended business logic or application purpose, e.g. a survey or managing a client database at a service provider to transact business with a client. In the following, the above-mentioned data structure is understood as a collection of data values, the relationships among them, and the functions or operations that can be applied to the data.

If the request for handling data 107 includes a request for retrieving and/or calculating data from and/or by the data access device, the processing unit 103 may perform any measures to query a database or fetch data from a database residing within the TEE 101, to analyze the results or to view aggregated data sets. Thus, the processing unit 103 also transforms the request into a data structure, which is meaningful to and expected by the application or application component.

According to the content of the request for handling data 107 the processing unit 103 may also generate a plurality of target IDs, which the request is addressed to or affected by.

The DEE unit 104 is configured to manipulate the received data structure aided by the plurality of target IDs 109 to enforce a data exposure policy (DEP) which defines how the received data structure is to be handled. Its output includes another data structure 110, which reflects the required measures demanded by the DEP. The details of the DEE 104 are to be discussed in the following elaborations concerning FIG. 2.

The output unit 105 is configured to output the another data structure, which is now compliant with the DEP as will also be elaborated upon in the following section concerning FIG. 2.

Figure 2:
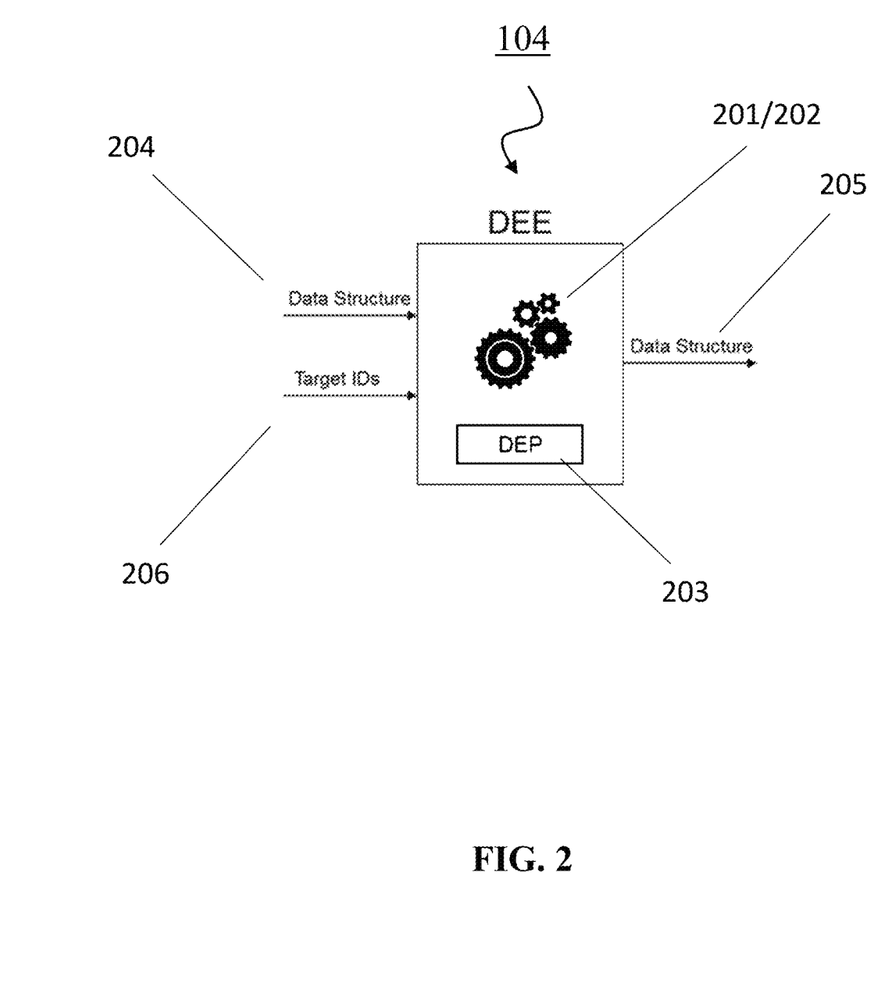
FIG. 2 shows a detail of a device according to an embodiment.

FIG. 2 shows a DEE unit 104 of a data access device 100 according to an embodiment, which relates the general embodiment shown in FIG. 1. The DEE unit 104 of this embodiment includes a parser unit 201 and a manipulator unit 202, which are configured to cooperate to enforce a DEP 203. Here, the parser unit 201 is configured to identify participating data types in the data structure 204 received by the DEE, which are affected by the DEP 203, while the manipulator unit 202 is configured to manipulate the received data structure by dropping, masking or encrypting data fields in the data structure, where the data types of said data fields are the participating data types, namely the data fields which are affected by the DEP 203. The DEE unit 104 may also include a copy unit (not shown), which is configured to copy the contents of the received data structure 204 into an intermediate data structure, which the manipulator unit uses to perform its data manipulations, which eventually leads to an output data structure 205, which has been sanitized by the DEP. Besides receiving an input data structure 204, the DEE unit 104 is also configured to receive a plurality of target IDs 206, which may be further needed to instruct the manipulator unit 202 to apply the DEP on data in the received data structure belonging to the respective target IDs. The DEE 104 in this embodiment includes the DEP 203, but in another embodiment the DEP 203 may be another entity residing outside the DEE unit 104 but inside the data access device 100.

In a further embodiment, the data fields include identification fields and other data fields and the manipulator 202 unit is further configured to manipulate the received data structure 204 by dropping, masking or encrypting the identification fields, if the DEP 203 requires anonymization and/or to manipulate the received data structure 204 by dropping, masking or encrypting any data field, which the DEP 203 requires to manipulate.

The DEP 203 generally includes a set of instructions to control the DEE unit 104. In an embodiment, the set of instructions may include anonymization instructions, identification exposure instructions and an aggregation policy. The anonymization instructions instruct the parser unit 201 of the DEE unit 203 to identify data in the received data structure to be anonymized by identifying the according identification fields in the data structure as prescribed by the DEP. The identification exposure instructions instruct the parser unit 201 of the DEE unit 104 to identify other data in the received data structure meant to be exposed and instruct the manipulator unit 202 of the DEE unit 104, to which target IDs and how the identified other data is to be exposed. The aggregation policy instructs the parser unit 201 and/or the manipulator unit 202 to control the aggregation of data of a specific data type in the received data structure before further processing is performed. Any instruction in the set of instructions may also be conditional and may only be executed depending on any of the target IDs including the target ID 108, which is provided in the original request for handling data.

In an example illustrating this embodiment and the mentioned aggregation policy, the DEP may regulate further processing of an "online survey", which may allow participants/users of the survey identified by their respective target ID to each provide a rating value for another to be rated user of the survey. The another user of the survey application may be a manager of a group of people including the (active) participants of the survey and may therefore only have passive voting rights encompassing the right to query the accumulated voting data on his/her e.g., performance. Hence, while the active participants of the survey, the voters, provide requests to the data access device 100 for handling their input data, the passive participant (the group manager in this example) of the survey provides a request for handling his/her query data to the data access device 100. In order to ensure complete confidentiality of the voters personal data, the DEP may not only require the anonymization of the voter's personal data, but may also require that the manager may not review his rating data before a certain amount of votes have accumulated. It may be assumed, for the sake of this example, that after a certain time only one vote has been cast and the to be rated manager is allowed to determine, who has not yet cast his/her vote in order (this is common to enable the manager to manage the survey), the manager can then easily determine the identity of the one voter despite the fact that all voter's personal data have been anonymized. In order to avoid this or any other undesired exposure of survey data, an according aggregation policy may control the exposure of voting data depending on an amount of cast votes as shown in this example.

In a further embodiment, the DEP 203 is accessible to all users of the data access device and may be exposed to any user as part of an attestation process, which is an integral part of the TEE 101. Since it is an aim of the embodiments to bring a new level of trust for data providers, a solution encourages users to provide their sensitive data to data handling systems. The customers need to be able to verify that the system they are communicating with will behave as expected. This is true of many TEE use cases, and in the case of the embodiments, in which the DEP may be published and users need to trust the system to be compliant with an untampered with DEP. Remote attestation is a method by which a host authenticates its hardware and software configuration to a remote host. The goal of remote attestation is to enable a remote system (challenger) to determine the level of trust in the integrity of a platform of another system (attestator). The architecture for remote attestation consists of two major components: integrity measurement architecture and remote attestation protocol. In case of a TEE provided by Intel SGX/AMD SME, remote attestation is done via a proprietary protocol that involves several messages being exchanged that results in a report signed by Intel that:

1. Verifies that the component is running in an SGX/SME enclave or TEE;
2. Provides a measurement that distinctly identifies the code and data that were loaded into that enclave;
3. Provides a shared secret that can be the base to a secure communication channel with the enclave.

Based on this report, the challenger knows that the code is protected in an enclave and cannot be modified, what specific code that is and can proceed to securely communicate with the component based on the shared secret to obtain, as an example, the DEP.

In a further embodiment, the DEE unit 104 further includes an aggregation controller, which is configured to calculate a permitted amount of aggregations or accumulations of content of the received data structure, where an aggregation or accumulation is understood as an accumulation of content in the received data structure 204 due to repeated data input at the input unit 102 by different target IDs 108 (e.g. different users identified by different target IDs cast their vote or provide their rating data). In order to perform data accumulation in the received data structure 204 according to the aggregation policy the aggregation controller is further configured to buffer the received data structure and to add data to it, until a condition of the aggregation policy is met, where the added data is repeatedly fed in at the input unit and which is affected by the aggregation policy.

In a further embodiment, the aggregated data is encrypted before being stored by the aggregation controller. Here, a system is introduced, which includes the data access device (100) and an encryption storage and an extraction storage, where the encryption storage is configured to encrypt and buffer the received data structure and to repeatedly add data to it by encrypting and storing the aggregating subset of data, until a condition of the aggregation policy is met. At this stage of data aggregation, the aggregated data is processed by the DEE as received data structure according to the aggregation policy of the DEP and may be viewed or otherwise reviewed by a user of the data access device. Since all data, which fall under the aggregation policy, is encrypted using a key that only the TEE has access to, the encryption key is protected and non-authorized manipulation or viewing of the buffered data is averted. Once the aggregation policy conditions are met, the data is decrypted by and extracted to the extraction storage ready to be output and viewed after a request to retrieve data from the data access device has been made by a user of the data access device.

In an embodiment, the aggregation policy includes an instruction to the DEE unit that no field is be exposed unless at least a certain amount of distinct data entries identified by their respective target IDs has been provided to the data access device. As an example, it may be desirable to block the exposure of data fields until at least 10 distinct people have provided data to the system. An unintended revelation of a user's identity can be averted by this measure as has already been elaborated upon by the above example illustrating the aggregation policy.

In yet another embodiment, the aggregation policy includes another instruction to the DEE unit that a calculated field in the aggregated data structure held in the DEE unit is only exposed, if more than a certain amount of distinct data entries identified by their respective target IDs have been provided to the data access device. In order to attain aggregation policies meeting the needs of particular use cases aggregation policy instructions as the two above described may be combined in any way.

Figure 3:
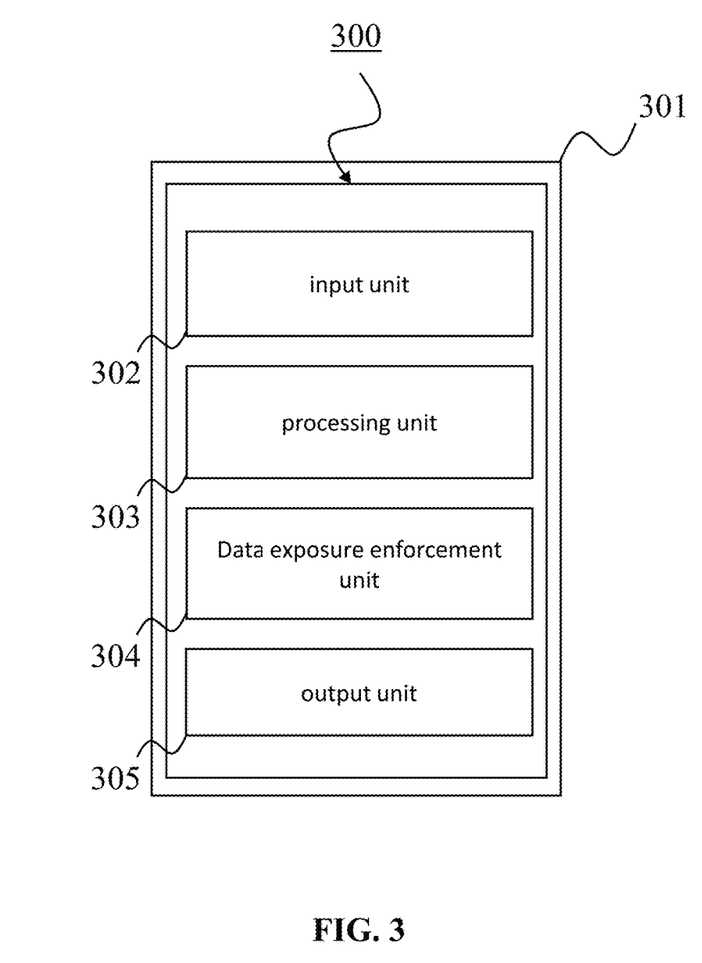
FIG. 3 shows a device according to an embodiment.

FIG. 3 shows a data access device 300 for enforcing a data policy device 300 and running in a trusted execution environment 301 according to an embodiment. The data access device 300 for enforcing a data policy includes an input unit 302, a processing unit 303, a DEE unit 304 and an output unit 305, where the data access device 300 is configured to run in a TEE 301; the input unit 302 is configured to receive a first data including a request for handling data, and a target ID; the processing unit 303 is configured to process the first data to attain a second data including the target ID and a data structure according to requirements of an application running in the data access device; the DEE unit 304 is configured to manipulate the second data according to a DEP to attain a third data; and the output unit 305 is configured to output the third data.

Figure 4:
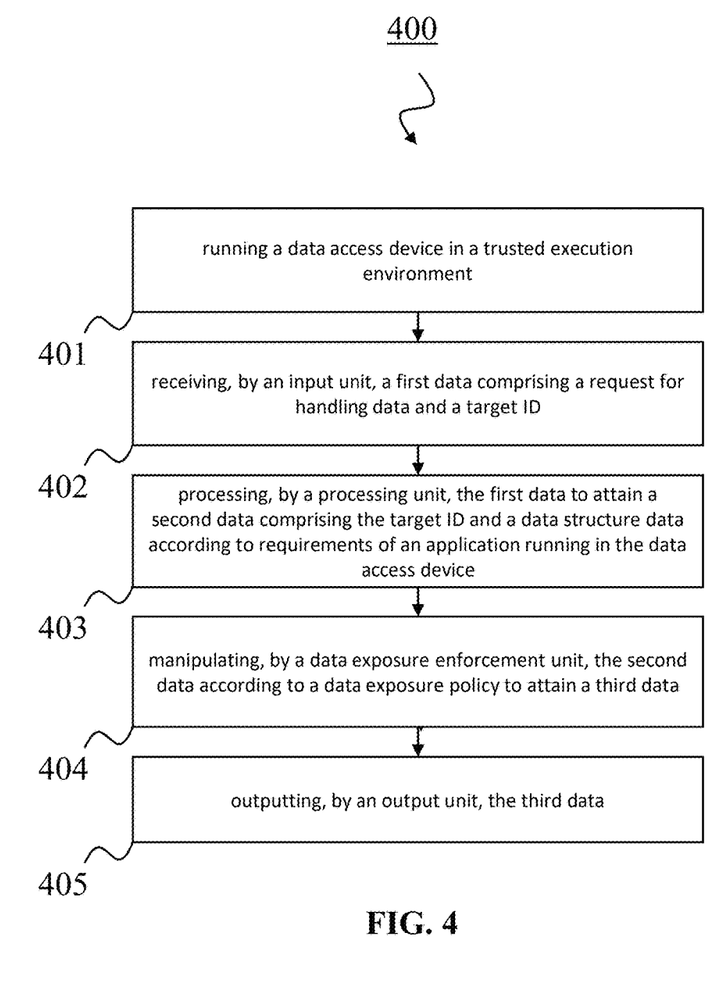
FIG. 4 shows a method according to an embodiment.

FIG. 4 shows a method 400 for enforcing a data policy by a data access device, where the method includes the steps of running 401 a data access device in a TEE; receiving 402, by an input unit, a first data including a request for handling data and a target ID; processing 403, by a processing unit, the first data to attain a second data including the target ID and a data structure data according to requirements of an application running in the data access device; manipulating 404, by a DEE, unit, the second data according to a DEP to attain a third data; and outputting 405, by an output unit, the third data.

It may be understood, with respect to the embodiments, that other variations can be understood and effected by those persons of ordinary skill in the art.

The invention claimed is:

1. A data access device for enforcing a data policy, comprising a processor configured to implement a trusted execution environment (TEE) in a secure area of the processor, and a memory comprising computer program code that, when executed by the processor, configures the processor to implement, in the TEE, steps of:
   receiving a first data comprising a request for handling data, and a target identification (ID);
   processing the first data to attain a second data comprising the target ID and a data structure according to requirements of an application running in the data access device;
   manipulating, by a data exposure enforcement (DEE) process operating on the processor in the TEE, the second data according to a data exposure policy (DEP) to attain a third data, comprising sanitizing the second data by identifying one or more fields in the second data that are affected by the DEP and performing one or more of: dropping, masking, or encrypting the one or more fields based on identification of the one or more fields as being affected by the DEP, wherein said one or more fields constitute less than all of the second data and wherein performing the one or more of: dropping, masking, or encrypting the one or more fields is applied to less than all of the second data; and
   outputting the third data, wherein
   the request for handling data comprises the request to provide data to the application or to retrieve data from the application,
   the DEP is a set of instructions to control the processor, and the instructions comprise:
      anonymization instructions to identify data in the second data to be anonymized by identifying the according identification fields in the data structure;
      exposure instructions to identify other data in the second data meant to be exposed and to instruct to which target IDs and how the identified other data is to be exposed; and
      an aggregation policy to control the aggregation of data of a specific data type in the second content data before further processing is performed, and
   wherein any instruction in the set of instructions is executed depending on any of the target IDs, and
   the processor is further configured to:
   calculate a permitted amount of aggregations of the second data, wherein aggregation comprises an accumulation of the second data due to repeated data input; and
   buffer the aggregating subset of the second data, which is affected by the aggregation policy, until a condition of the aggregation policy is met.

2. The data access device according to claim 1, wherein the data fields comprise identification fields and other data fields; and the processor is configured to manipulate the second data by dropping, masking or encrypting the identification fields if the DEP requires anonymization, and/or to manipulate the second data by dropping, masking or encrypting any data field, which the DEP requires to manipulate.

3. The data access device according to claim 1, wherein the DEP is stored in the DEE within the TEE.

4. The data access device according to claim 1, wherein the DEP is disclosed to all target IDs.

5. A system, comprising:
a data access device comprising a processor configured to implement a trusted execution environment (TEE) in a secure area of the processor, and a memory comprising computer program code that, when executed by the processor, configures the processor to implement, in the TEE, steps of:
receiving a first data comprising a request for handling data, and a target identification (ID);
processing the first data to attain a second data comprising the target ID and a data structure according to requirements of an application running in the data access device;
manipulating, by a data exposure enforcement (DEE) process operating on the processor in the TEE, the second data according to a data exposure policy (DEP) to attain a third data; and
outputting the third data,
wherein the request for handling data comprises the request to provide data to the application or to retrieve data from the application,
the DEP is a set of instructions to control the processor, and the instructions comprise:
anonymization instructions to identify data in the second data to be anonymized by identifying the according identification fields in the data structure;
exposure instructions to identify other data in the second data meant to be exposed and to instruct to which target IDs and how the identified other data is to be exposed; and
an aggregation policy to control the aggregation of data of a specific data type in the second content data before further processing is performed, and
wherein any instruction in the set of instructions is executed depending on any of the target IDs, and
wherein the processor is further configured to:
calculate a permitted amount of aggregations of the second data, wherein aggregation comprises an accumulation of the second data due to repeated data input; and
buffer the aggregating subset of the second data, which is affected by the aggregation policy, until a condition of the aggregation policy is met, and
wherein the memory further comprises an encryption storage and an extraction storage, wherein
the encryption storage is configured to buffer data by encrypting and storing the aggregating subset of the second data; and
the extraction storage is configured to store data by decrypting and storing the aggregated subset of the second data as the third data, when the condition of the aggregation policy is met.

6. The data access device according to claim 1, wherein the aggregation policy comprises an instruction to the processor that no field is to be exposed unless at least a certain amount of distinct first data entries has been provided to the data access device.

7. The data access device according to claim 1, wherein the aggregation policy comprises another instruction to the processor that a calculated field in the aggregated subset of the second data is only exposed if more than a certain amount of distinct first data entries identified has been provided to the data access device.

8. A method for enforcing a data policy, comprising:
running a data access device in a trusted execution environment;
receiving, by an input unit, a first data comprising a request for handling data and a target ID;
processing, by a processing unit, the first data to attain a second data comprising the target ID and a data structure data according to requirements of an application running in the data access device;
manipulating, by a data exposure enforcement unit, the second data according to a data exposure policy to attain a third data, comprising sanitizing the second data by identifying one or more fields in the second data that are affected by the data exposure policy and performing one or more of: dropping, masking, or encrypting the one or more fields based on identification of the one or more fields as being affected by the DEP, wherein said one or more fields constitute less than all of the second data and wherein performing the one or more of: dropping, masking, or encrypting the one or more fields is applied to less than all of the second data; and
outputting, by an output unit, the third data, wherein
the request for handling data comprises the request to provide data to the application or to retrieve data from the application,
the DEP is a set of instructions to control the processor, and the instructions comprise:
anonymization instructions to identify data in the second data to be anonymized by identifying the according identification fields in the data structure;
exposure instructions to identify other data in the second data meant to be exposed and to instruct to which target IDs and how the identified other data is to be exposed; and
an aggregation policy to control the aggregation of data of a specific data type in the second content data before further processing is performed, and
wherein any instruction in the set of instructions is executed depending on any of the target IDs, and
the processor is further configured to:
calculate a permitted amount of aggregations of the second data, wherein aggregation comprises an accumulation of the second data due to repeated data input; and
buffer the aggregating subset of the second data, which is affected by the aggregation policy, until a condition of the aggregation policy is met.

* * * * *